April 30, 1963   F. J. LUKETA   3,087,271
HIGH CAPACITY MIDWATER TRAWL NET PANEL LAYOUT
Original Filed Jan. 3, 1961   5 Sheets-Sheet 1
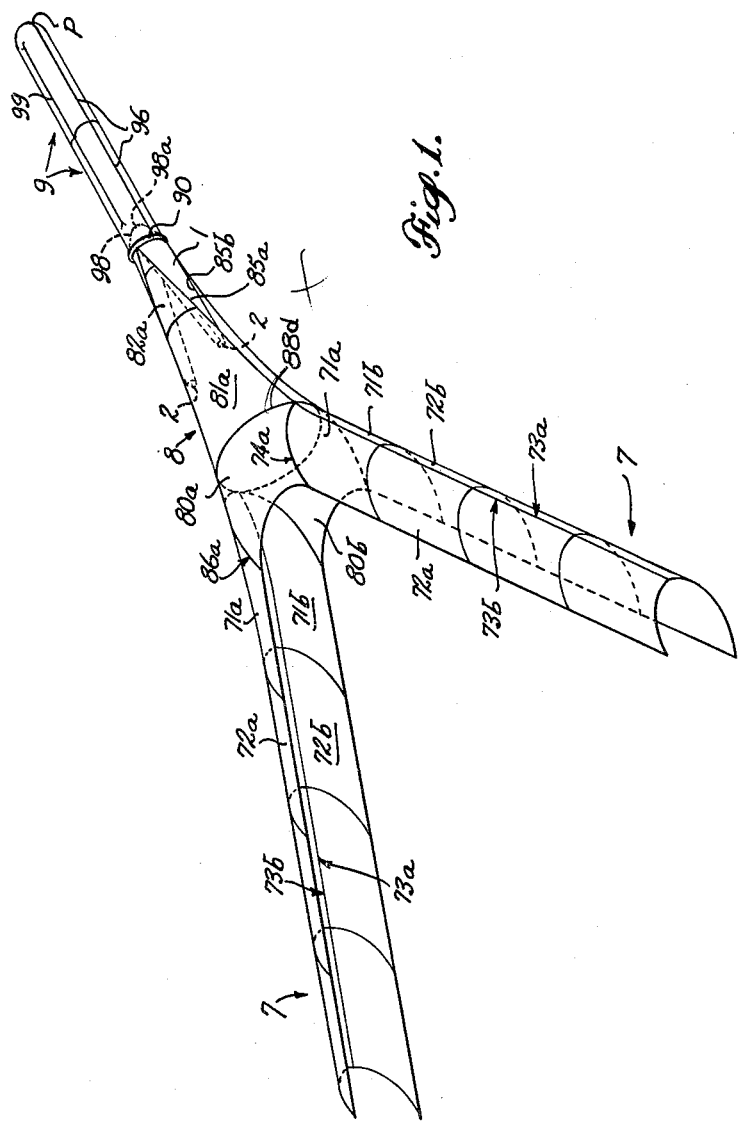
INVENTOR.
FRANK J. LUKETA
BY
Reynolds + Christensen
ATTORNEYS

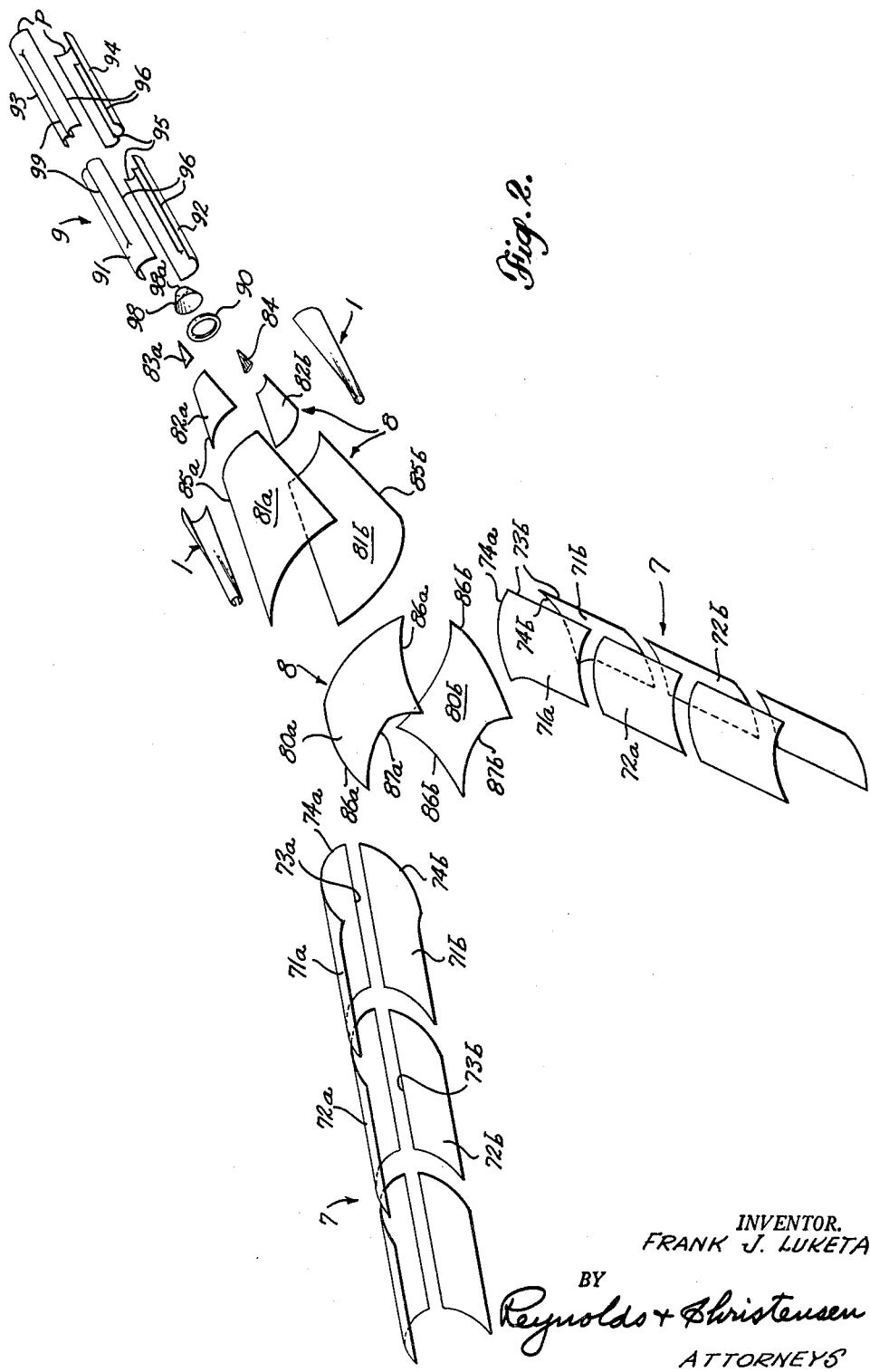

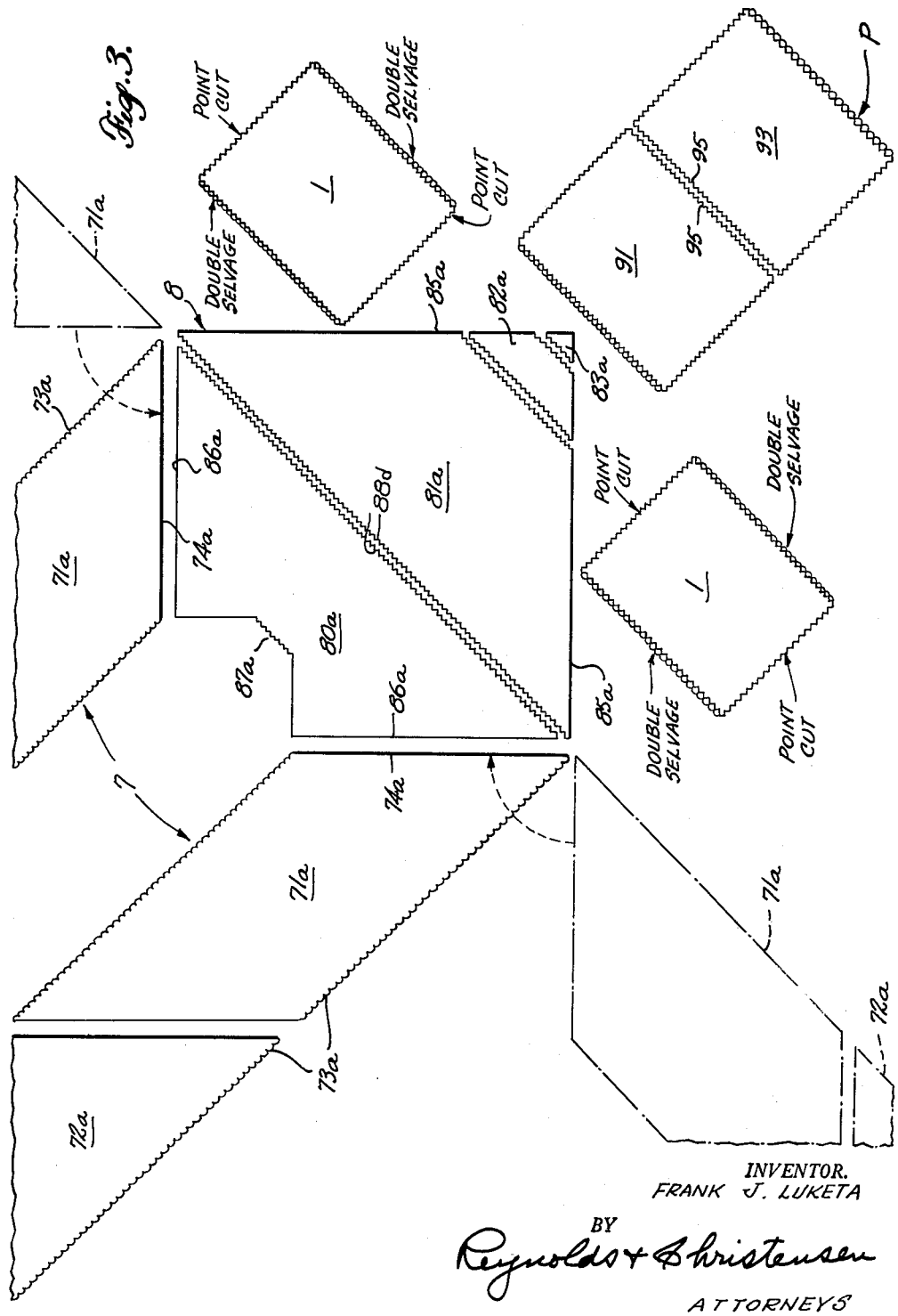

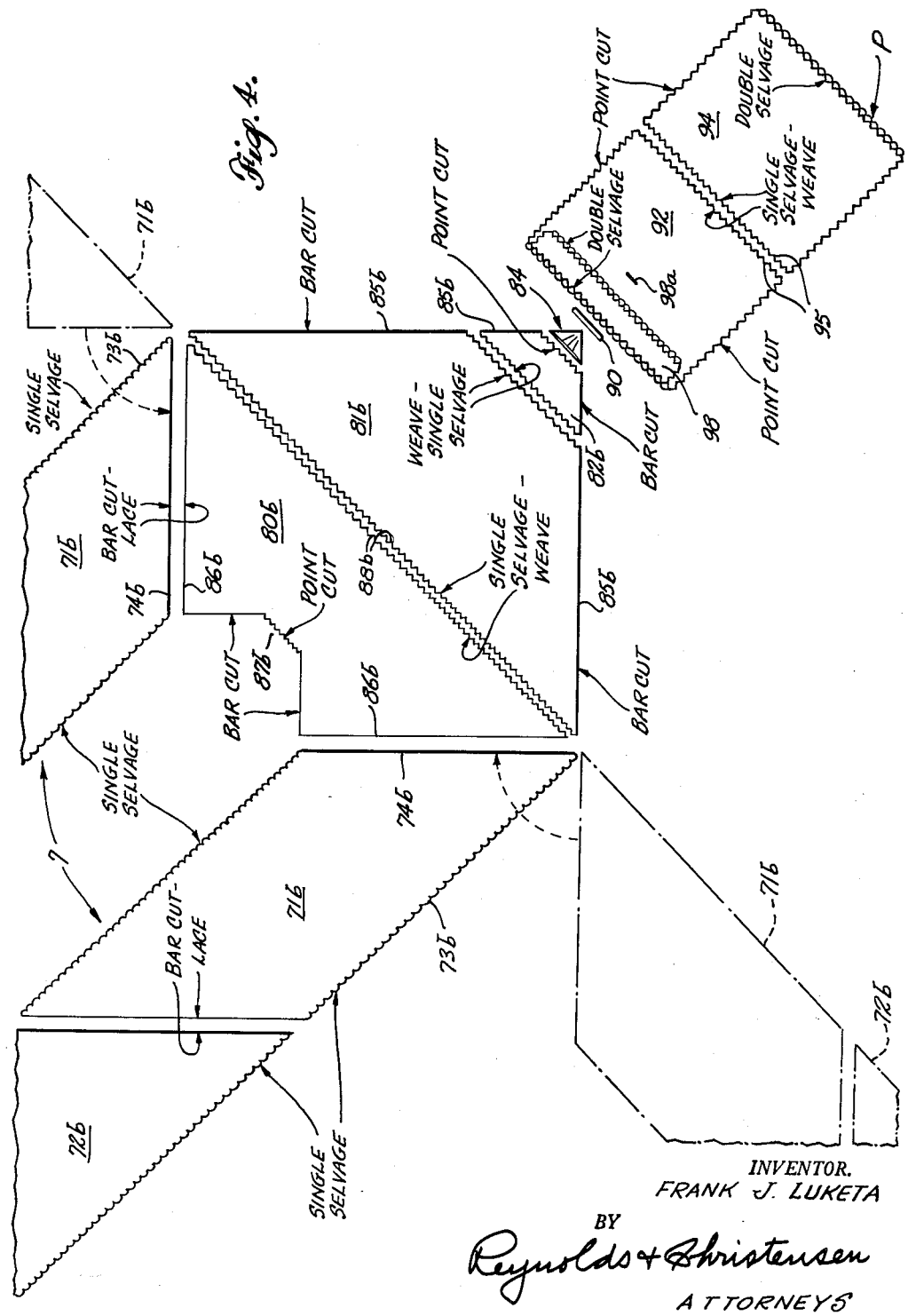

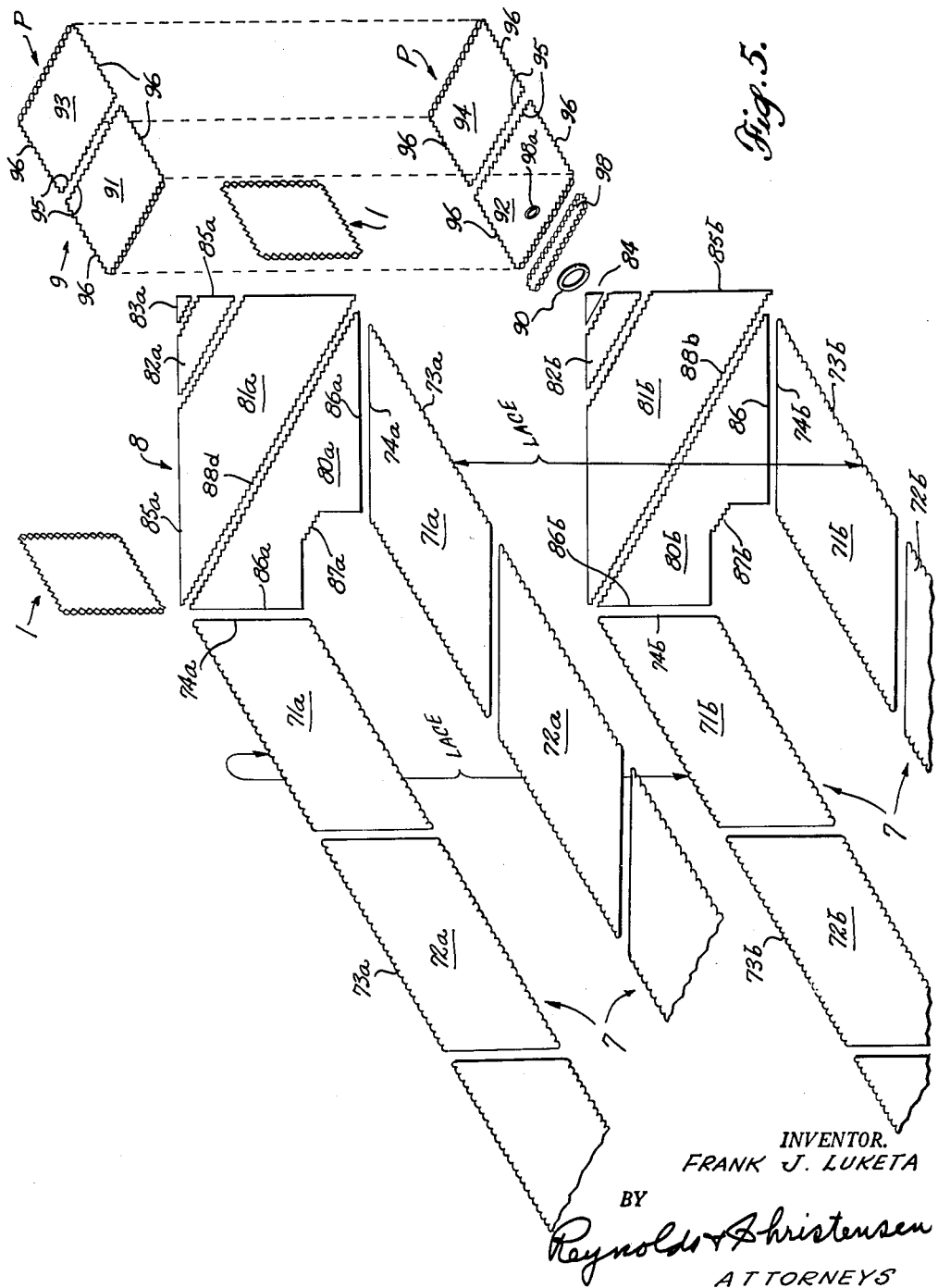

United States Patent Office 3,087,271
Patented Apr. 30, 1963

3,087,271
HIGH CAPACITY MIDWATER TRAWL NET
PANEL LAYOUT
Frank J. Luketa, 5567 Greenwood Ave., Seattle 3, Wash.
Continuation of application Ser. No. 80,056, Jan. 3, 1961.
This application July 6, 1962, Ser. No. 208,690
15 Claims. (Cl. 43—9)

This invention concerns a net for use in midwater trawling operations of capacity to handle a catch that may run well beyond a hundred tons of fish in a single haul, and which is intended to be handled by powered equipment by what is known as the drum trawling method. More particularly, this application is directed to the layout of panels for incorporation in such a net, from commercially available netting, in such manner that there is no loss or waste of netting, that the cutting of the netting is by bar cuts or point cuts which can be done much more easily and accurately than by tapered cuts, that the mesh can be so oriented that such as is heavily stressed in hauling is of adequate strength and orientation to assume and distribute the stress, and that such as is lightly stressed is so oriented that its mesh always is kept open to lessen drag.

The net used for illustrating the present invention is that which is the subject of a companion application entitled Large Capacity Midwater Trawl Net, Serial No. 80,170, filed January 3, 1951.

That application deals primarily with the rigging of the net and the relationship of its component elements in use, whereas this application deals with the cutting and assembly of a net of the size and capacity indicated from commercially available mesh, to promote the advantages of such a net, and with the removal and replacement of damaged panels of netting.

Such a net employs long curtains of a vertical extent such, in relation to the vertical spacing of upper and lower curtain lines to which its edges are secured, that in use the curtains belly aft between their upper and lower edges. One specific object of this invention is to afford adequate curtain height, and by proper orientation to ensure that the mesh thereof is maintained fully open to lessen water drag, and also, by proper cutting, especially at the curtains' after edge, to ensure that they join fully and properly to funnel panels similarly cut.

The same net employs two suspenders of mesh which at their after edges join and encircle the forward edge of the cod end, and the forward end of each suspender is connected to a sweepline concentrating all tension in towing and hauling a loaded cod end in such suspenders, and distributing the load throughout the cod end, but relieving the funnel ahead of the cod end and leading thereinto, and of which funnel the suspenders are a part, from all cod end stress, notwithstanding that the funnel and suspenders are joined integrally. Another specific object of this invention is to choose netting of correct twine size and mesh, and to cut and orient the mesh of the suspenders and of the funnel, in a net of the size and capacity indicated, to achieve the desired concentration and the relief of stresses in the individual components, and at the same time to simplify the repair of panels that may be damaged.

The net also incorporates an automatic spiller for excess fish caught in the funnel and unable to enter a filled cod end, and a trap to prevent escape of fish from the cod end. This spiller and its relationship to cod end and to the trap at the entrance to the latter forms part of the subject matter of Serial No. 80,170.

These and other objects of this invention will be made clear from a study of the accompanying drawings, and of this specification, and the novel features of the invention are set forth in the claims.

FIGURE 1 is a somewhat diagrammatic isometric view of the net, fully assembled and in the shape it would assume during trawling, and FIGURE 2 is a similar view, but with individual panels exploded or separated.

FIGURE 3 is a plan layout of the netting panels which make up the top of the net, and FIGURE 4 is a like view of the bottom panels.

FIGURE 5 is a combined isometric view, exploded, of the top and bottom panels in the relative positions they would occupy when assembled.

FIGURES 1 and 2 do not attempt to show the type of cut along the edges of panels, but the other figures do show this, such being an important feature of this invention.

Referring first to FIGURE 1, the net used for illustration comprises a cod end 9, a funnel 8 diverging ahead of and leading into the open forward end of the cod end, an overhang 80a and underhang 80b which in effect are forward extensions of the funnel, and side curtains 7 which diverge ahead of their juncture to the sides of the funnel. A suspender 1 at each side of the after part of the funnel is secured to and about the forward end of the cod end, and each converges to a point of connection at 2, at its forward end, for attachment of sweeplines (not herein shown, but shown in my said companion application) by which the entire load of the cod end is assumed, both during trawling and hauling, and the funnel proper and curtains are relieved of such load. Curtain lines, not shown here but shown in said companion application, have the upper and lower edges of the respective curtains 7 attached to them, and are maintained at such vertical spacing as ensures that the curtains will belly markedly aft by water reaction, throughout their length, although their mesh is relaxed and substantially fully open. Doors (not shown) ahead of each curtain cause the latter to spread widely apart during trawling, and the curtain lines and sweepline at each side are anchored to the respective doors and so are held properly spaced apart.

Commercial netting comes in any desired continuous length and in any desired width within the rather restrictive limits of the commercial weaving machine's width. Since the length of the cod end and of the funnel greatly exceeds this maximum width and since the mesh in different parts of the net is of different mesh and twine size, and oriented in some components for transmission of stress by elongation and compression laterally of the mesh, but in other components must be oriented to avoid its stressing and to keep the mesh open to lessen drag, it is necessary to build up each component of the net from panels of correct mesh and twine size, and correctly oriented, to achieve this objective in each individual component. Each must also be so cut as to join correctly the adjoining edges of other components.

FIGURE 2 shows the several panels of which each component is assembled, and other figures will show how the desired orientation is effected with the least waste of netting and greatest simplicity of cutting. The cod end 9 may be of suitable length, but since the mesh therein is of large twine size, and oriented longitudinally in the straight twine direction rather than in the cross twine direction (as those terms are defined for example in Fisheries Leaflet 394 dated September 1951 of the Fish and Wildlife Service), each of the forward and after edges of rectangular panels 91, 92, 93 and 94, and so on, is either a single selvage edge or a double selvage edge, and the appropriate edges are woven together to make up, after weaving together the side point cuts, an elongated cylinder. A point cut is made directly across the length of netting, without waste, as shown in FIGURES 3 to 5 inclusive. Whereas it might be considered desirable to cut a single top panel and a single bottom panel each of the full length of the cod end, and so to avoid weaving of the adjoining transverse edges of top panels 91, 93 and of bottom panels 92, 94, weaving only the selvage edges of each such single panel to the other, so doing would disregard the mesh orientation so necessary to assume the longitudinal load. Such assumed orientation would impose the load in the cross twine direction, which is ill-adapted to assume heavy loads. If, however, the mesh is so oriented that the load is assumed in the straight twine direction, in which orientation it is well-adapted to assume heavy loads, the necessary length of cod end, with meshes so oriented, requires joining panels each of a length corresponding to the width of the commercial netting along adjoining selvage edges. They are joined by weaving rather than lacing. The composite upper and lower parts of the cod end are then joined along opposite point cut edges along side seams 96, which also are woven. The woven seams throughout the cod end assure maximum strength in this highly stressed part. The forward end of the cod end should be a double selvage edge, where it joins the rear end of the funnel 8. The joint between them is indirect, although it could be direct except that a direct woven joint would tend to collapse under heavy loads, wherefore a noncollapsible expansion ring 90, made for example of aluminum, serves as anchorage for the forward end of the cod end and for the after end of the suspenders 1 and funnel 8, and holds open at all times the entrance to the cod end. In a midwater trawl net the expansion ring would be of neutral buoyancy, although in a bottom trawl net it would be ballasted. The pursed end P of the cod end should also be a double selvage edge.

Forward of the cod end is the funnel 8, in which the straight twine direction should be transverse, for it must spread laterally at its forward edge or bosom, and must spread somewhat vertically, but the funnel should not assume any appreciable stress, and should retain its mesh widely open during trawling for minimum drag. The overhang 80a and underhang 80b may be considered as part of the funnel 8. The top component of the funnel, nearly square in shape, comprises panels 80a, 81a, 82a and 83a, each bar cut along its side edges and having the selvage edge extending transversely. The panels 80a, 81a, and 83a are of the full width of various strip widths of commercial netting, and to avoid waste the panel 82a is the material cut from the re-entrant bar and point cut indentation 87a that defines the bosom. The adjoining selvage edges of panels 80a and 81a are woven together along the transverse line 88a, as are like edges of panels 81a and 82a, 82a and 83a. These panels are oriented with the straight twin direction of their meshes longitudinally of the direction of advance. The lower component of the funnel comprises panels 80b, 81b and 82b, similar in size, mesh, twine size, derivation, type of cut and orientation to the panels 80a, 81a and 82a of the top component, previously described. Panels 80b and 81b are woven along the transverse line 88b. All panels of the funnel except the suspenders 1, later described, are unstressed and can therefore be of light twine and have open meshes, which means they produce only a desirably low drag when towed. The panels' bar cut side edges 85a and 85b which converge rearwardly from lines 88a and 88b are laced to the point cut side edges of the suspenders 1 to complete the funnel, except for the spiller about to be described.

There might also be a panel in the lower component similar to panel 83a, but this net has a pleated spiller of rubber or the like to facilitate escape of fish in excess of the number that the cod end can contain, and this spiller 84 takes the place of a panel corresponding to panel 83a; it is joined to the suspenders 1 along its side edges, but is not joined to the funnel at its forward edge.

The funnel 8 has the bar cut edges 85a and 85b, converging to a point at the expansion ring, hence it is clear that no connection between funnel and cod end which is adequate to sustain the load of a large catch can be made at such isolated points. To sustain such a load, and to avoid stressing and deforming the funnel's mesh, there is incorporated as part of the closure defined by the funnel a load sustaining suspender 1 at each side. Each suspender is a rectangle of heavy twine mesh, point cut from one double selvage edge to the other. Their rear double selvage edges are each distributed half-way about the cod end's open forward end, or about the expansion ring 90 that defines such open end, and anchored thereto, and their forward double selvage edges are concentrated at a single point of connection 2 for attachment to the sweepline. The mesh of each suspender is oriented with the straight twine pull in the direction of advance, that is, fore and aft. Their point cut side edges are laced to the after part of edges 85a and 85b respectively of the funnel components, wherefore the suspenders close the gaps between these edges, but the length and arrangement and mesh orientation of the cone-like suspenders 1 relative to the corresponding length of edges 85a, 85b is such that when the suspender is fully extended longitudinally no stress is imposed thereby on the top and bottom funnel components. The side edges of the suspender mesh are joined, ahead of the point of termination of the junction between suspenders and funnel panels.

The curtains are made up of upper and lower panels 71a and 71b, 72a and 72b, etc. each taken from a strip of the appropriate width of commercial netting, bar cut at intervals into reasonably short interchangeable lengths, the upper panels 71a, 72a being laced along a selvage edge 73a to corresponding lower panels 71b, 72b at their selvage edge 73b. The bar cut rear edges 74a, 74b of the rearmost curtain panel are laced to the like bar cut edges 86a, 86b at the sides of the funnel. What stress there is is directed up and down. The division of the length of a curtain into short lengths of bar cut commercial netting, and the use of similarly short lengths of curtain line, makes possible the prompt removal and replacement of any damaged panel. The upper and lower selvage edges of the curtains are laced to upper and lower curtain lines that are held apart vertically by a distance materially less than the total height of a curtain, hence each curtain bellies aft as it is drawn through the water, yet its unstressed meshes of small twine are maintained widely open, creating but little drag.

The net disclosed in my companion application employs a constrictive but expansible trap just inside the entrance to the cod end, to allow entrance but to block exit of fish. Such a trap is of netting, shown at 98, and is joined at its forward edge to the expansion ring 90, with an elastic constrictor 98a about its rear edge.

The dot-dash lines 71a, 72a, 71b and 72b in FIGURES 3 and 4 show the curtains' straight twine-cross twine orientation in relation to the rest of the panels.

In the represented net it is preferred to seam together, as at 99, the top and bottom of the cod end throughout most of its length, thus to form two laced-together tubes side by side. This cuts the cross-sectional bulk of the cod end when filled by about half for ease of hauling and handling, yet does not reduce the great longitudinal tensile strength of the cod end needed for hauling a capacity catch of well over one hundred tons in one continuous movement or lift up the stern ramp of a trawler.

FIGURES 3 and 4 will demonstrate to one skilled in the art of designing and using netting that the various panels can be cut without any waste from lengths of commercial netting of appropriate width, and that when oriented and assembled as described such netting will be of open or of constricted mesh, as the stress in a particular component requires.

This application is a continuation of my application Serial No. 80,056, filed Jan. 3, 1961, now abandoned.

I claim as my invention:

1. A trawl net of the character described comprising an elongated cod end of netting panels, open at its forward end, two suspender panels of netting, one at each side and each secured at its after end half-way about the open end of the cod end, and each concentrated at its forward end at a single point of connection for a sweepline, a funnel of a plurality of panels of netting defining collectively top, bottom, and side walls, secured about its after end to the forward end of the cod end, curtains of netting secured to the forward side edges of the funnel at each side thereof, and diverging forwardly, the meshes of each of the cod end and suspender panels being oriented with a selvage edge forwardly and with the straight twine pull directed fore and aft.

2. A trawl net as in claim 1, wherein the panels of the top and bottom of the funnel are cut along their side edges to converge adjacent the open end of the cod end, the upper and lower edges of the suspender panels being similarly cut, and joined to the side edges of the respective funnel panels.

3. A trawl net as in claim 2, wherein the convergent side edges of the funnel panels are bar cut, and the panel is of sufficient lateral extent that tension forwardly and laterally along its forward edge, in use, maintains its mesh open.

4. A trawl net as in claim 2, wherein the side edges of the funnel's top and bottom panels are bar cut, and of the suspenders laced thereto are point cut, and when tensioned are of a length to relieve said top and bottom panels of material stress.

5. A trawl net as in claim 1, wherein the funnel includes an overhang and an underhang panel of like size and shape, each formed at its front with a re-entrant central notch having bar cut side edges and a point cut transverse edge intermediate the bar cut edges of the notch, the several edges of each notch defining a bosom across which a bosom line may be secured for stretching the funnel's mesh forwardly and laterally.

6. A trawl net as in claim 5, wherein the outside edges of the overhang and underhang panels are bar cut and converge forwardly to the re-entrant notch, the rearmost curtain panel at each side being also bar cut to match, and laced to the overhang and underhang panels' bar cut side edges.

7. A trawl net as in claim 6, wherein each curtain is formed of complemental upper and lower panels laced together along a selvage edge of each to define a longitudinal median line of the curtain, and the forward and after edges of the respective upper and lower panels are bar cut to converge rearwardly at such median line.

8. A trawl net of the character described formed of a plurality of netting panels constituting an elongated cod end open at its forward end and having its meshes oriented with the straight twine direction fore and aft and a selvage edge about its open forward end, two suspenders of netting each with its meshes oriented with the straight twine direction fore and aft, and a selvage edge forward and the opposite selvage edge at the after end, distributed about and secured to the open end of the cod end, and the meshes of each suspender converging forwardly to a point of connection for a sweepline at the respective sides of the net, and a funnel of netting secured to the open end of the cod end and diverging thence laterally and vertically.

9. A trawl net as in claim 8, wherein the funnel includes a plurality of panels at top and at bottom each including a forward and a rear panel joined along points defining a transverse line intermediate its forward and rear, and each such forward and rear panel bar cut along side edges that converge forwardly and rearwardly respectively from such transverse line, to define a generally square top and bottom respectively.

10. A trawl net as in claim 9, wherein the suspenders are point cut along their edges which extend fore and aft, and are joined to the bar cut edge of the rear panel of the top and bottom respectively of the funnel.

11. A trawl net as in claim 10, wherein the joined edges of the suspenders and of the funnel panels terminate at a point aft of the point of connection of the funnels, the suspender panel fore and aft edges being joined together forward of such point of termination.

12. A trawl net as in claim 10, including upper and lower curtain panels of netting joined along a median longitudinal line and bar cut along their after edges to diverge forwardly from such median line, and joined along their bar cut edges to the remaining bar cut edge of the top and bottom panels respectively of the funnel.

13. A trawl net as in claim 8, wherein the adjoining selvage edges of the cod end and of the suspenders are double selvages.

14. A curtain for a midwater trawl net including complemental upper and lower panels laced together along an edge of each that is horizontal in use, to define a longitudinal median line of the curtain, the forward and after edges of the respective upper and lower panels being cut to converge in the fore and aft direction of such median line.

15. A trawl net of the character described formed of a plurality of netting panels constituting an elongated cod end open at its forward end and having its meshes oriented with the straight twine direction fore and aft and a selvage edge about its open forward end, two suspenders of netting each with its meshes oriented with the straight twine direction fore and aft, and a selvage edge forward and the opposite selvage edge at the after end, distributed about and secured to the open end of the cod end, and the meshes of each suspender converging forwardly to a point of connection for a sweepline at the respective sides of the net.

References Cited in the file of this patent

UNITED STATES PATENTS

| 1,692,830 | Hansen et al. | Nov. 27, 1928 |
| 2,816,386 | Harris et al. | Dec. 17, 1957 |

FOREIGN PATENTS

| 405,405 | Great Britain | Feb. 8, 1934 |